United States Patent
De Ruijter et al.

(10) Patent No.: US 12,483,931 B2
(45) Date of Patent: Nov. 25, 2025

(54) METHOD TO ADD ADDITIONAL DATA RATE TO LEGACY PHYSICAL INTERFACE

(71) Applicant: Silicon Laboratories Inc., Austin, TX (US)

(72) Inventors: Hendricus De Ruijter, Rocklin, CA (US); Terry Dickey, Pflugerville, TX (US); Wentao Li, Mountain House, CA (US); Bryan Murawski, Belmont, MA (US); Marius Munder, Unna (DE)

(73) Assignee: Silicon Laboratories Inc., Austin, TX (US)

( * ) Notice: Subject to any disclaimer, the term of this patent is extended or adjusted under 35 U.S.C. 154(b) by 261 days.

(21) Appl. No.: 18/236,184

(22) Filed: Aug. 21, 2023

(65) Prior Publication Data

US 2025/0031094 A1    Jan. 23, 2025

Related U.S. Application Data

(60) Provisional application No. 63/527,953, filed on Jul. 20, 2023.

(51) Int. Cl.
*H04W 28/06* (2009.01)
*H04W 28/08* (2023.01)
*H04W 28/10* (2009.01)

(52) U.S. Cl.
CPC ....... *H04W 28/06* (2013.01); *H04W 28/0967* (2020.05); *H04W 28/10* (2013.01)

(58) Field of Classification Search
CPC .. H04L 27/2692; H04L 1/0002; H04W 28/06; H04W 28/0967; H04W 28/10; H04W 28/22
See application file for complete search history.

(56) References Cited

U.S. PATENT DOCUMENTS 10,312,955 B1    6/2019  de Ruijter et al.
2003/0031130 A1*  2/2003  Vanghi .............. H04W 28/0284
                                                        370/278

(Continued)

OTHER PUBLICATIONS

IEEE Computer Society, "IEEE Standard for Low-Rate Wireless Networks," IEEE Std 802.15.4™-2020, Revision of IEEE Std 802.15.4-2015, Jul. 23, 2020, 799 pages.

(Continued)

*Primary Examiner* — Khoa Huynh

(74) *Attorney, Agent, or Firm* — Zagorin Cave LLP

(57) ABSTRACT

A technique for adding a new information rate to a legacy physical interface of a communications system includes using a rate switch packet including a distinct rate select start-of-frame delimiter that indicates a newly defined physical interface packet. The rate switch packet uses the same modulation scheme as a base rate packet (e.g., a packet using an information rate defined by a standard communications protocol) and the same preamble pattern as the base rate packet. The preamble length of the rate switch packet can be the same as or different from the preamble length of the base rate packet. An embodiment uses antenna diversity by selecting the antenna in the rate switch packet and using the selected antenna to receive an adjusted rate packet. Additional rate switch start-of-frame delimiters can be used to indicate more than one adjusted rate packet, e.g., to support multiple adjusted information rates.

22 Claims, 9 Drawing Sheets

(56) References Cited

U.S. PATENT DOCUMENTS

| | | | |
|---|---|---|---|
| 2005/0152404 A1* | 7/2005 | Holmquist | H04L 1/0025 370/485 |
| 2009/0109955 A1* | 4/2009 | Lakkis | H04B 1/69 370/350 |
| 2023/0164830 A1 | 5/2023 | de Ruijter | |

OTHER PUBLICATIONS

Tektronix, "Wi-Fi: Overview of the 802.11 Physical Layer and Transmitter Measurements," downloaded from www.tektronix.com/wifi on Jun. 27, 2023, 44 pages.

* cited by examiner

METHOD TO ADD ADDITIONAL DATA RATE TO LEGACY PHYSICAL INTERFACE

CROSS REFERENCE TO RELATED APPLICATION(S)

This application claims the benefit of U.S. Provisional Application No. 63/527,953, entitled "METHOD TO ADD ADDITIONAL DATA RATE TO LEGACY PHYSICAL INTERFACE," naming Hendricus De Ruijter et al. as inventors, which application was filed Jul. 20, 2023, and which application is incorporated herein by reference.

BACKGROUND

Field of the Invention

This application relates to communications systems in general, and more particularly to techniques for increasing the information rate in communications systems.

Description of the Related Art

A communications system compliant with a predetermined communications protocol may be deployed in an application that needs to satisfy increasingly higher information rates (i.e., data rates). A legacy physical interface includes hardware and software that has been superseded but is difficult to replace because of widespread use. A technique to increase the information rate of a legacy physical interface includes using a mode switch packet having a distinct physical layer header. Another technique defines new rate bits in an existing field of an existing packet format that requires new hardware to decipher or to provide a seamless rate transition. Upgrading or completely replacing hardware already in widespread usage can be inconvenient and costly. Accordingly, improved techniques are desired to transition legacy physical interfaces to support higher information rates.

SUMMARY OF EMBODIMENTS OF THE INVENTION

In an embodiment, a method for wireless communications includes transmitting a base rate packet including a base rate preamble, a base rate start-of-frame delimiter, and a base rate payload. The method includes transmitting a rate switch packet. The rate switch packet includes the base rate preamble and a rate switch start-of-frame delimiter. The method includes transmitting an adjusted rate packet after transmitting the rate switch packet. The adjusted rate packet includes an adjusted rate preamble, an adjusted rate start-of-frame delimiter, and an adjusted rate payload. The base rate packet and the rate switch packet are transmitted at a base rate and the adjusted rate packet is transmitted at an adjusted rate. The adjusted rate is different from the base rate.

In an embodiment, a wireless communications system includes a transmitter having a first mode of operation and a second mode of operation. In the first mode of operation the transmitter is configured to transmit information at a base rate, the transmitter is configured to transmit a base rate packet including a base rate preamble, a base rate start-of-frame delimiter, and a base rate payload, and the transmitter is configured to transmit a rate switch packet including the base rate preamble and a rate switch start-of-frame delimiter. In the second mode of operation the transmitter is configured to transmit information at an adjusted rate and the transmitter is configured to transmit an adjusted rate packet after transmitting the rate switch packet. The adjusted rate packet includes an adjusted rate preamble, an adjusted rate start-of-frame delimiter, and an adjusted rate payload. The adjusted rate is different from the base rate.

In an embodiment, a method for wireless communications includes receiving a base rate packet including a base rate preamble, a base rate start-of-frame delimiter, and a base rate payload. The method includes receiving a rate switch packet. The rate switch packet includes the base rate preamble and the rate switch start-of-frame delimiter. The method includes receiving an adjusted rate packet after receiving the rate switch packet. The adjusted rate packet includes an adjusted rate preamble, an adjusted rate start-of-frame delimiter, and an adjusted rate payload. Information in the base rate packet and the rate switch packet is received at a base rate and the information in the adjusted rate packet is received at an adjusted rate. The adjusted rate is different from the base rate.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

A technique for adding a new data rate to a legacy physical interface of a communications system uses a rate switch packet including a distinct rate select start-of-frame delimiter that indicates a newly defined physical interface packet. The rate switch packet uses the same modulation scheme as a base rate packet (e.g., a packet transmitted using a modulation scheme and an information rate defined by a standard communications protocol) and the same preamble pattern as the base rate packet. The preamble length of the rate switch packet can be the same as or different from the preamble length of the base rate packet. An embodiment takes advantage of antenna diversity by selecting an antenna for adjusted rate communications using the rate switch packet and using the selected antenna to receive the adjusted rate packet. Additional rate switch start-of-frame delimiters can be used to indicate more than one adjusted rate packet, e.g., to support multiple adjusted data rates.

Figure 1:
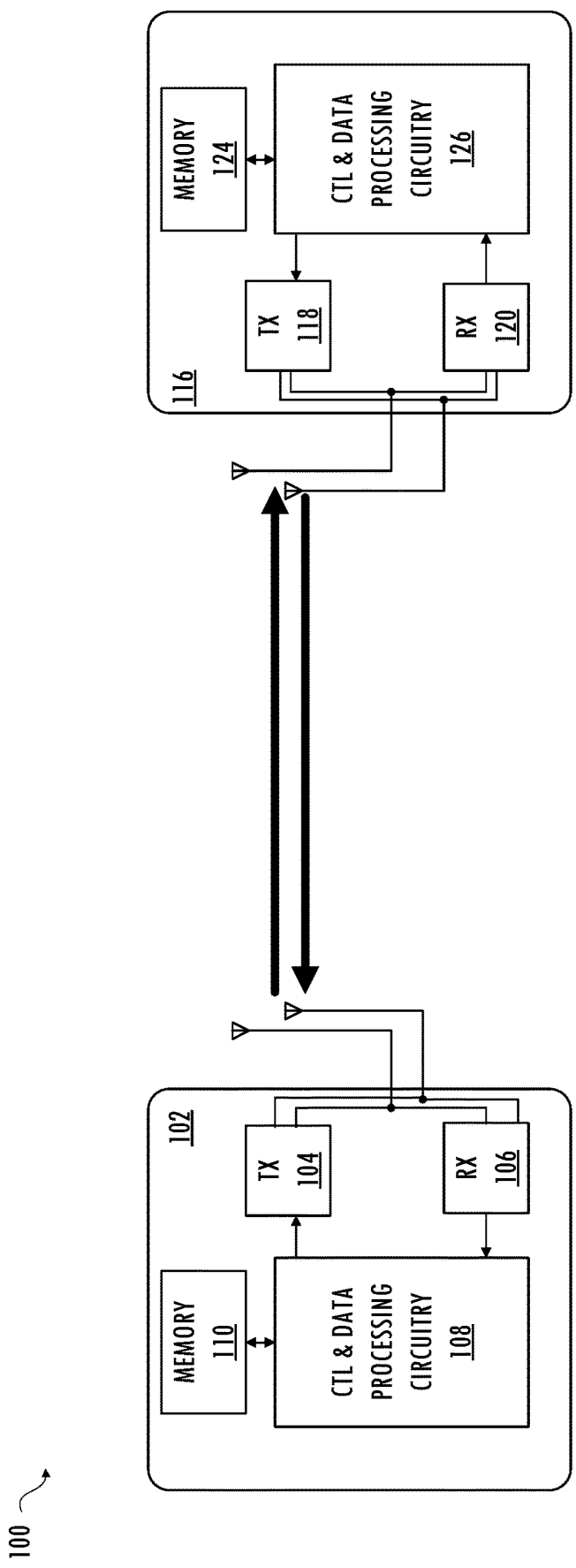
FIG. 1 illustrates a functional block diagram of an exemplary wireless communications system.

Referring to FIG. 1, in at least one embodiment, wireless communications system 100 includes wireless communications device 102 having transmitter 104, receiver 106, control & data processing circuitry 108, and memory 110, and wireless communications device 116 having transmitter 118, receiver 120, control & data processing circuitry 126, and memory 124. Although wireless communications device 102 and wireless communications device 116 are illustrated as each including only one transmitter, one receiver, and two antennas, in other embodiments of wireless communications system 100, wireless communications device 102 or wireless communications device 116 includes multiple transmitters, receivers, additional antennas, or a single antenna with internal circuitry selection or radio frequency switches. Wireless communications system 100 can communicate information modulated using a predetermined wireless communications protocol, e.g., data modulated using a wide personal area network (WPAN) protocol (e.g., IEEE 802.15.4 based protocols) or data modulated using a wide local area network (WLAN) protocol (e.g., an IEEE 802.11 b/g/n protocol). However, in other embodiments, wireless communications system 100 can transmit and receive data compliant with other wireless communications protocols.

Figure 2:
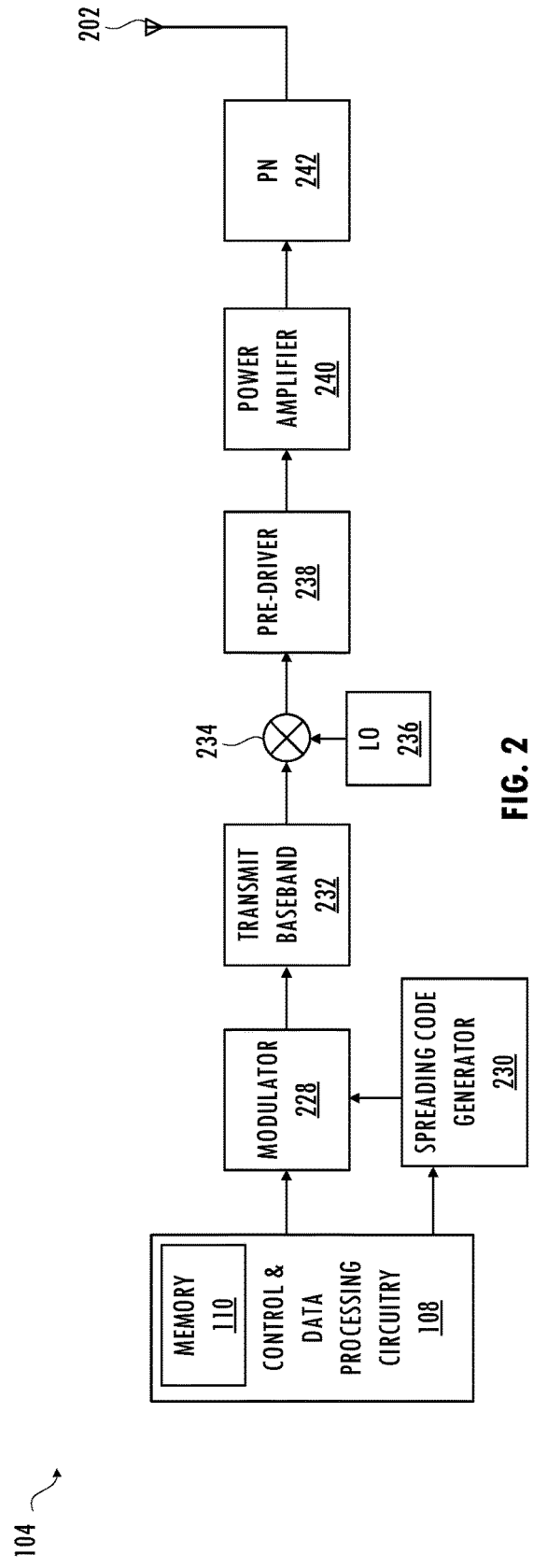
FIG. 2 illustrates a functional block diagram of the exemplary wireless communications transmitter of FIG. 1.

FIG. 2 illustrates an exemplary embodiment of transmitter 104 that may be included in a physical radio of wireless communications device 102 or wireless communications device 116 of FIG. 1. Control & data processing circuitry 108 of FIG. 2 may perform a variety of functions (e.g., logic, arithmetic, etc.). For example, data processing circuitry 108 executes a program, routine, or algorithm (whether in software, firmware, hardware, or a combination thereof) that performs desired control or data processing tasks consistent with a physical layer of a communications protocol and provides data to modulator 228. In at least one embodiment, transmitter 104 implements an IEEE 802.15.4 communications protocol (e.g., Zigbee having an information rate of 250 kbps) utilizing Offset-Quadrature Phase-Shift Keying (OQPSK) with Direct Sequence Spread Spectrum (DSSS), i.e., using a pseudorandom bit sequence known as a spreading sequence. Each bit of the spreading sequence is referred to as a chip. In an exemplary embodiment, each nibble of data (e.g., a value that would otherwise be represented by four bits of data) is represented by a 32-bit chip sequence and spreading code generator 230 provides spreading sequences for use by modulator 228.

Modulator 228 provides modulated data to transmit baseband circuit 232, which in an embodiment includes a digital-to-analog converter and analog programmable gain filters. Transmit baseband circuit 232 provides the baseband (or intermediate frequency (IF)) signal to frequency mixer 234, which performs frequency translation or shifting of the baseband signal using a reference or local oscillator (LO) signal provided by local oscillator 236. In at least one operational mode of transmitter 104, frequency mixer 234 translates the baseband signal centered at DC to a 2.4 GHz frequency band. Pre-driver 238 amplifies the signal generated by frequency mixer 234 to a level sufficient for power amplifier 240. Power amplifier 240 further amplifies the signal to provide a higher power signal sufficient to drive passive network 242 and antenna 202. Passive network 242 provides impedance matching, filtering, and electrostatic discharge protection.

Figure 3:
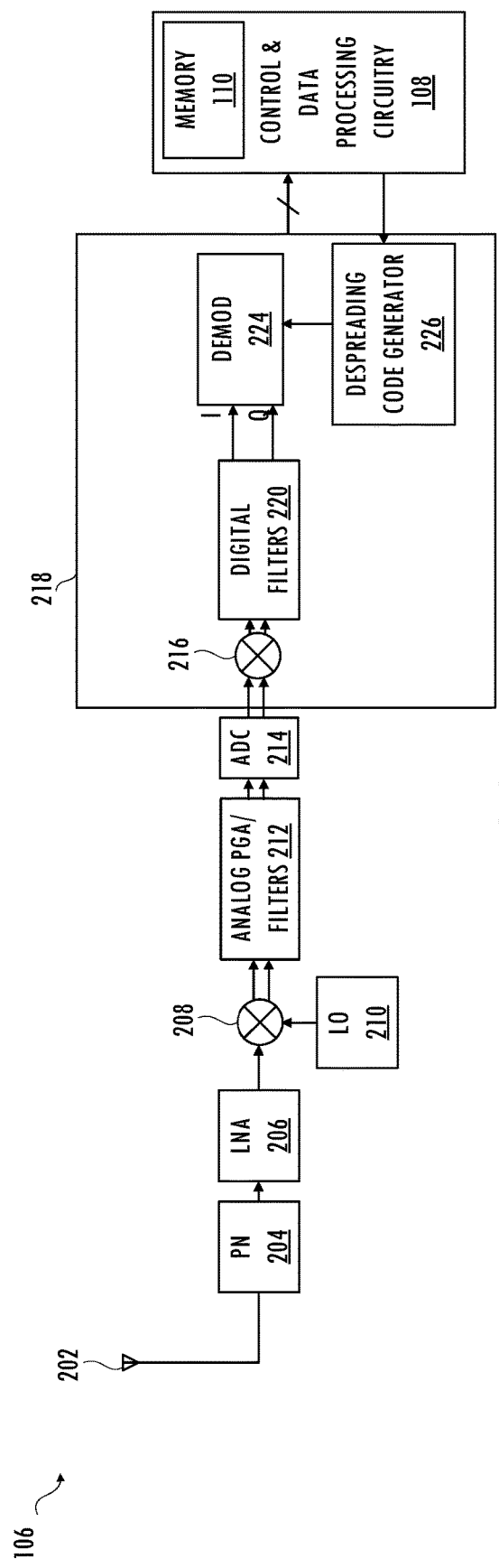
FIG. 3 illustrates a functional block diagram of the exemplary wireless communications receiver of FIG. 1.

FIG. 3 illustrates an exemplary embodiment of receiver 106 that may be included in a radio of the wireless communications devices described above. Antenna 202 provides a radio frequency (RF) signal to passive network 204, which provides impedance matching, filtering, and electrostatic discharge protection. Passive network 204 is coupled to low-noise amplifier (LNA) 206, which amplifies the RF signal without substantial degradation to the signal-to-noise ratio and provides the amplified RF signal to frequency mixer 208. Frequency mixer 208 performs frequency translation or shifting of the RF signal using a reference or local oscillator (LO) signal provided by local oscillator 210. For example, in at least one operational mode of receiver 106, frequency mixer 208 translates the RF signal from a 2.4 GHz frequency band to baseband frequencies centered at DC (i.e., zero-intermediate frequency (ZIF) in a ZIF mode of operation). In another operational mode, receiver 106 is configured as a low-intermediate frequency (LIF) receiver (i.e., in a LIF mode of operation) and frequency mixer 208 translates the RF signal to a low-intermediate frequency (e.g., 100-200 kHz) to avoid DC offset and 1/f noise problems of ZIF receivers.

Frequency mixer 208 provides the translated output signal as a set of two signals, an in-phase (I) signal and a quadrature (Q) signal. The I and Q signals are analog time-domain signals. In at least one embodiment of receiver 106, the analog programmable gain amplifier and filters 212 provide amplified and filtered versions of the I and Q signals to analog-to-digital converter (ADC) 214, which converts those versions of the I and Q signals to digital I and Q signals (i.e., I and Q samples). Exemplary embodiments of ADC 214 use a variety of signal conversion techniques (e.g., delta-sigma (i.e., sigma-delta) analog-to-digital conversion). ADC 214 provides the digital I and Q signals to signal processing circuitry 218. In general, signal processing circuitry 218 performs digital signal processing (e.g., demodulation, frequency translation (e.g., using digital mixer 216), filtering (e.g., digital filters 220), or signal correction) of the digital I and Q signals. In at least one embodiment, signal processing circuitry 218 includes demodulator 224, which recovers or extracts information from digital I and Q signals (e.g., data signals, that were modulated by a transmitter (not shown) and provided to antenna 202 as RF signals). In at least one embodiment, despreading code generator 226 provides codes used by demodulator 224 to detect a symbol in a DSSS chip sequence. In at least one embodiment, one or more circuits of signal processing circuitry 218 converts digital I and Q signals from a Cartesian representation into polar representation (i.e., instantaneous phase and instantaneous amplitude) for use by a frequency correction circuit or phase measurement circuit (not shown).

Control & data processing circuitry 108 may perform a variety of functions (e.g., logic, arithmetic, etc.). For example, control & data processing circuitry 108 may use the demodulated data in a program, routine, or algorithm (whether in software, firmware, hardware, or a combination thereof) to perform desired control or data processing tasks.

In at least one embodiment, control & data processing circuitry 108, which includes memory 110, controls other circuitry, sub-system, or systems (not shown). In an embodiment, control & data processing circuitry 108 implements a data link layer that includes a state machine, defines state transitions, defines packet formats, performs scheduling, performs radio control, and provides link-layer decryption consistent with at least one wireless communications protocol.

Figure 4:
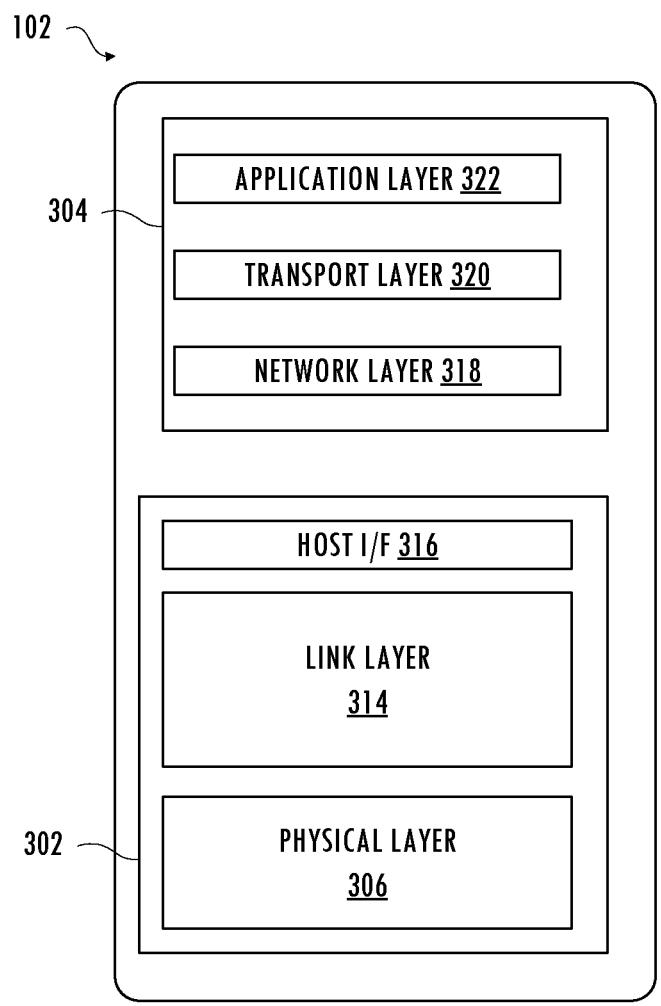
FIG. 4 illustrates a functional block diagram of a protocol stack executing on the exemplary wireless communications device of FIG. 1.

Referring to FIGS. 1 and 4, in an embodiment, wireless communications device 102 includes separate integrated circuits for implementing functions of controller 302 and host 304. In some embodiments, wireless communications device 102 incorporates functionality of controller 302 and host 304 in a single integrated circuit device. Controller 302 executes instructions to implement portions of a wireless communications network protocol stack. For example, controller 302 implements physical layer 306, which includes software that interacts with the RF transceiver (e.g., the transmitter and receiver described above). Link layer 314 interfaces directly to physical layer 306 to handle transmission and reception of associated signals. In at least one embodiment, link layer 314 of controller 302 communicates with host 304 via host interface 316. Host 304 implements upper layers of the communications protocol stack (e.g., network layer 318, transport layer 320, and application layer 322, which implements the upper layers for the protocol stack). In other embodiments, the layers of the software protocol stack have different distributions between controller 302 and host 304 or are completely implemented using controller 302. Transmitter 104 and receiver 106 are exemplary only and may vary with the communications protocol implemented by wireless communications system 100.

Figure 5A:
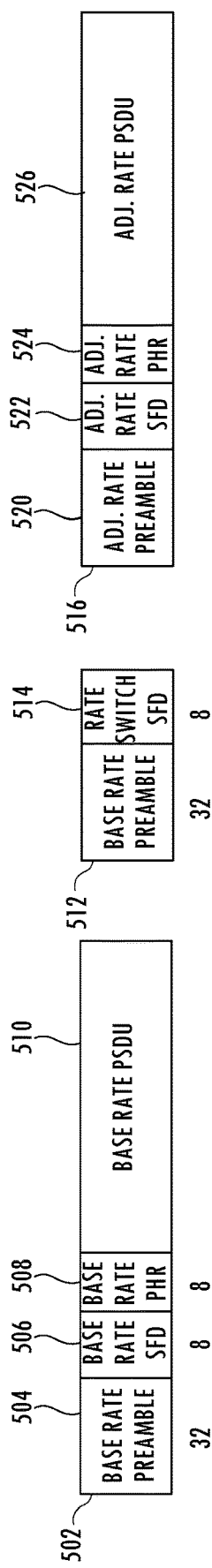
FIG. 5A illustrates data fields of exemplary packets of a wireless communications device consistent with at least one embodiment of the invention.

Referring to FIGS. 1 and 5A, in at least one embodiment, wireless communications device 102 uses a base rate to transmit a conventional radio packet, e.g., a packet consistent with IEEE 802.15.4 protocol. Base rate packet 502 includes base rate preamble 504 (e.g., four octets (i.e., eight symbols) of binary zeros), base rate start-of-frame delimiter 506 (e.g., one octet of "11100101" indicating the end of the synchronization header and the start of packet data), base rate physical layer header 508 (e.g., one octet) and base rate physical layer service data unit 510, which has a variable number of octets. Base rate physical layer service data unit 510 includes a header and a payload. Base rate preamble 504 is used by a receiving wireless communications device for synchronization. Start-of-frame delimiter 506 indicates the end of the preamble. Base rate physical layer header 508 includes control information, e.g., the number of bytes in physical layer service data unit 510, which may be a maximum value of 127 for a 7-bit length field. Base rate physical layer service data unit 510 includes Media Access Control (MAC) packet data units as the payload. In an embodiment, wireless communications device 102 transmits base rate packet 502 using O-QPSK, i.e., offset quadrature phase-shift keying. In an exemplary embodiment, during each data symbol period, four information bits are used to select for transmission 1 of 16 nearly orthogonal pseudo-random noise (PN) sequences, thereby spreading the information into 32 chips for transmission at a chip rate.

During operation in a base rate configuration, if wireless communications device 102 determines that the transmission medium has a sufficient signal-to-noise ratio (or other indication of the quality of the transmission medium) to support a higher information rate, then wireless communications device 102 will transition from the base rate to an adjusted rate configuration to increase the information rate, e.g., from a 250 kbps information rate to the chip rate of 2 Mbps by forgoing spreading. In the base rate configuration, wireless communications device 102 communicates the information rate change to another wireless communications device by transmitting rate switch packet 512. In an embodiment, rate switch packet 512 includes the base rate preamble and a rate switch start-of-frame delimiter 514 (e.g., one octet). In an embodiment, rate switch packet 512 does not include a payload and is smaller than base rate packet 502. The small size of rate switch packet 512 reduces the overhead and inefficiencies of this scheme. In other embodiments, rate switch packet 512 includes a payload field to communicate control information (e.g., selection of an antenna for receiving adjusted rate communications). Wireless communications device 102 transmits rate switch packet 512 using the same information rate and modulation scheme as used to transmit base rate packet 502.

After transmitting rate switch packet 512, wireless communications device 102 reconfigures itself to operate in an adjusted rate configuration and transmits adjusted rate packet 516. In an embodiment, adjusted rate packet 516 includes adjusted rate fields: adjusted rate preamble 520, adjusted rate start-of-frame delimiter 522, adjusted rate physical layer header 524, and adjusted rate physical layer service data unit 526. In general, overhead reduces the effective throughput and increases energy use for transmission and reception. Thus, the adjusted rate fields accommodate a higher data rate with a relatively small or minimum increase in overhead (e.g., short preamble and short start-of-frame delimiter). A physical interface with a high bandwidth efficiency may be desirable in bandwidth constrained regulatory domains, e.g., orthogonal frequency-division multiplexing (OFDM) domains. An exemplary low-cost application uses a simple frequency-shift keying (FSK) physical interface. In addition, in some embodiments, the gap between the rate switch packet and the adjusted rate packet is as short as possible, but long enough for wireless communications devices to reconfigure the physical interface at each side of the communications link. Wireless communications device 102 continues transmission using the adjusted rate for a predetermined number of packets, a predetermined amount of time, or indefinitely while conditions allow it, as discussed further below. In at least one embodiment, multiple rate switch start-of-frame delimiters are defined to support selection of an adjusted rate from multiple adjusted rates. An adjusted rate and corresponding mode of operation may be entered from a first mode of operation at the base rate or from a second mode of operation at another adjusted rate. One or more adjusted information rates may be used to support selection of the information rate according to signal-to-noise ratio (SNR), received signal strength indicator (RSSI), or other quality metric for the communications link.

Figure 5B:
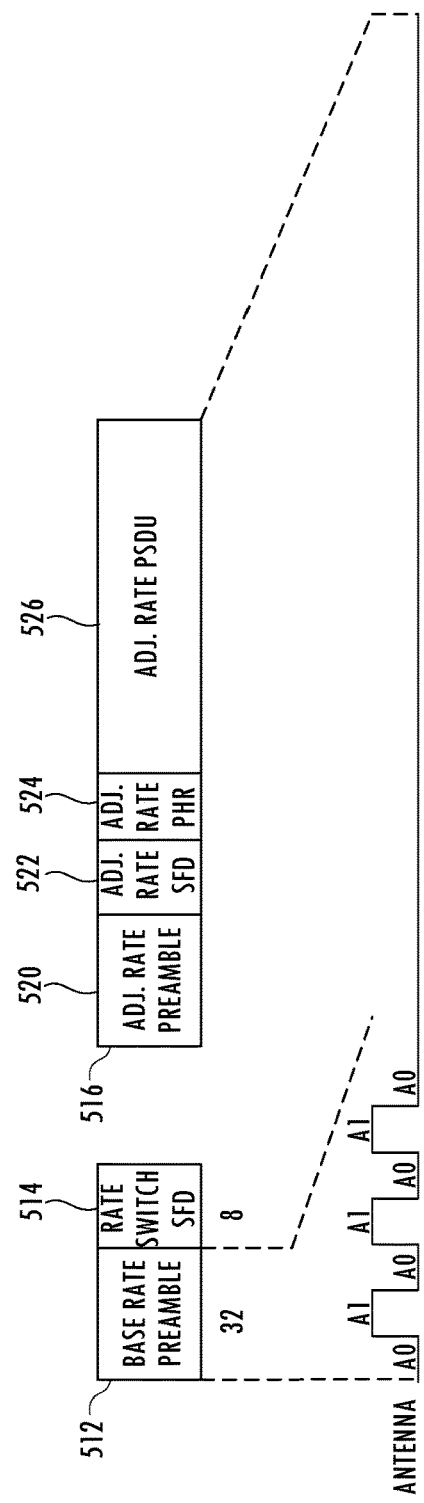
FIG. 5B illustrates an antenna diversity scheme of a wireless communications device consistent with at least one embodiment of the invention.

Referring to FIG. 5B, in at least one embodiment, the receiving wireless communications device alternates between at least two antennas (e.g., antenna A0 and antenna A1) during the base rate preamble of rate switch packet 512. The receiving wireless communications device determines the antenna with the highest probability of successful reception during the base rate preamble based on a quality metric (e.g., SNR, RSSI, error vector magnitude, eye pattern, or other communications quality metric), and selects that antenna to receive the remainder of the transmission, including rate switch start-of-frame delimiter 514, adjusted rate preamble 520, adjusted rate start-of-frame delimiter 522, adjusted rate physical layer header 524, and adjusted rate physical layer service data unit 526. In this embodiment, a relatively short, adjusted rate preamble is selected since the adjusted rate preamble is not needed to determine the antenna with the highest probability of successful reception. Thus, this scheme reduces overhead and is relatively efficient, even when implementing antenna diversity.

Figure 6:
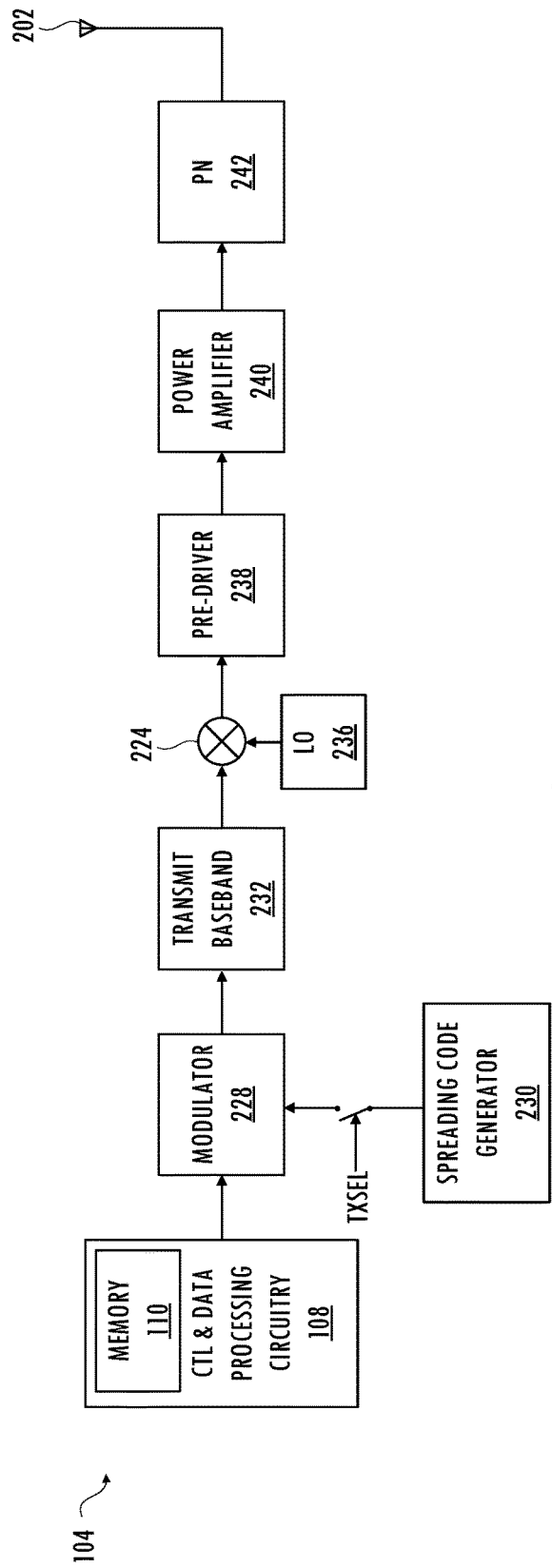
FIG. 6 illustrates a functional block diagram of an exemplary wireless communications transmitter consistent with at least one embodiment of the invention.

Referring to FIGS. 1 and 6, in at least one embodiment, an adjusted information rate is realized by transmitting information at the chip rate of the conventional system compliant with the IEEE 802.15.4 communications protocol. For example, by eliminating symbol-to-chip mapping of the information (i.e., eliminating spreading) and instead transmitting the information at the chip rate (e.g., an O-QPSK chip rate of 2 Mcps and an adjusted rate of 2 Mbps). Accordingly, transmitter 104 no longer needs to generate spreading codes and wireless communications device 102 decouples spreading code generator 230 from modulator 228, e.g., using control signal TXSEL to deactivate spreading code generator 230. Instead of spreading a four-bit symbol into 32 chip values, modulator 228 forgoes spreading and provides eight four-bit symbols modulated using O-QPSK. In another embodiment, minimum-shift keying (MSK) or other suitable modulation technique is used instead of O-QPSK. Minimum-shift keying at 2 Mbps has a similar modulation bandwidth as O-QPSK at 2 Mcps. To improve spectral properties of the adjusted rate packet, a Gaussian filter is used to shape the MSK symbols, creating GMSK modulation with a bandwidth-symbol time product (BT) of 0.5. The adjusted rate packet uses a preamble in the range of 8 bits to 64 bits (e.g., a 16-bit sequence of alternating ones and zeros). In an embodiment, the adjusted rate packet start-of-frame delimiter is in the range of 16 bits to 32 bits (e.g., 0111 1100 1110 1100 0011 1011 0101 0000) and the adjusted rate packet physical layer header is the same as the physical layer header used by the IEEE 802.15.4-2020 Smart Utility Network (SUN) FSK setup.

In other embodiments, different base physical interfaces are used with different adjusted rate physical interfaces. For example, an FSK physical interface is used for the base rate and an OFDM physical interface is used for the adjusted rate physical interface. OFDM can have a relatively large bandwidth efficiency (i.e., data rate per Hz bandwidth). Exemplary 16 quadrature amplitude modulation (QAM) as used by the SUN OFDM physical interface can have approximately 2.2 bits/Hz, whereas FSK is approximately 0.8 bits/Hz. Some sub-GHz communications are bandwidth constrained making high efficiency desirable.

The FSK physical interface (e.g., a SUN FSK physical interface) has a relatively long range that reaches many nodes in the network. If the measured link budget allows (e.g., when communicating with nodes near the transmitting wireless communications device), a rate switch packet could be transmitted using the same preamble as the base rate physical interface and including a special rate switch start-of-frame delimiter (i.e., a rate switch start-of-frame delimiter that is different from the base rate start-of-frame delimiter). If the SUN FSK physical interface is used as the base rate physical interface, then a valid start-of-frame delimiter with an uncoded physical layer service data unit according to the corresponding standard is 1001 0000 0100 1110. The rate switch start-of-frame delimiter should be different to indicate to the receiver that it should reconfigure to an OFDM physical interface. An exemplary rate switch start-of-frame delimiter is an inverted version of the base rate start-of-frame delimiter: 0110 1111 1011 0001.

In an exemplary transmitter, when reconfiguring from FSK to OFDM, a different modulator path is used. For example, instead of in-loop modulation as part of the phase-locked loop that is used to generate the radio frequency signal, an IQ modulator is used to generate in-phase and quadrature signals, or a polar modulator is used to generate magnitude and phase signals. An exemplary OFDM transmitter uses a linear power amplifier while an exemplary FSK transmitter uses a non-linear power amplifier for high power efficiency. Embodiments of transmitter 104 have two modulators, a modulator that is configurable, or a combination thereof (e.g., part of the modulator is shared and configurable while other parts are dedicated to a predetermined physical interface). In embodiments including a single transmitter antenna and multiple modulators or transmitter paths, each modulator or transmitter path is selectively enabled and coupled with radio frequency switches to the transmitter antenna. In embodiments including multiple transmitter antennas and at least one transmitter path, each modulator or transmitter path is selectively enabled and coupled to a selected transmitter antenna via radio frequency switches.

Figure 7:
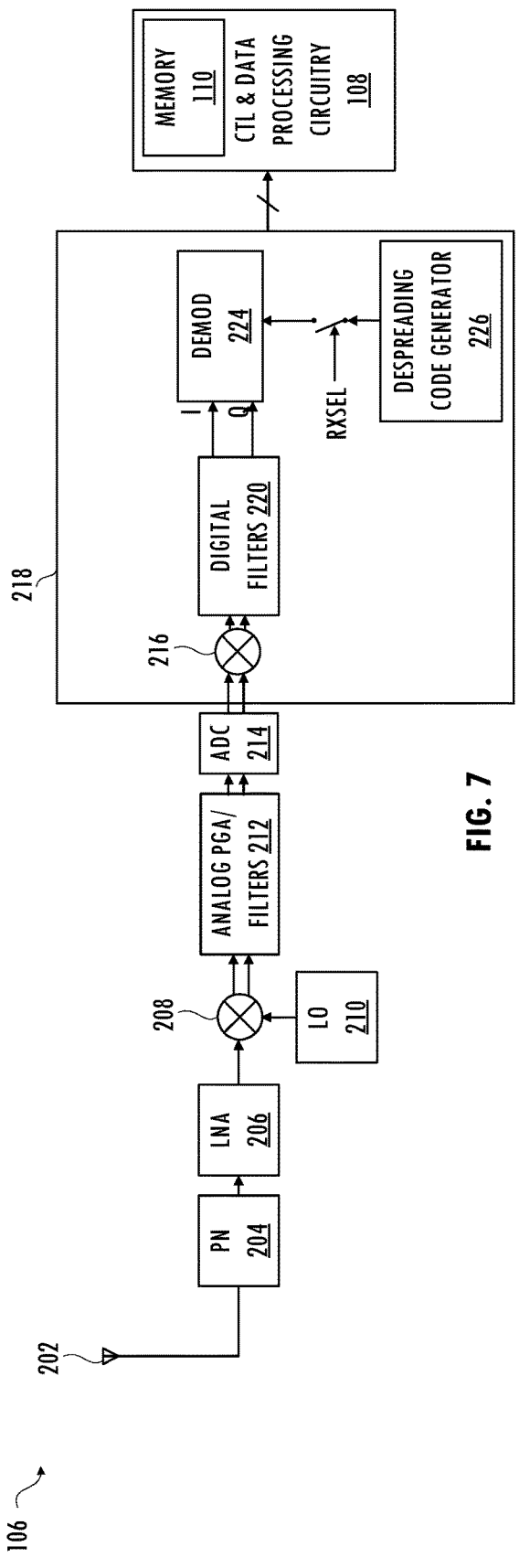
FIG. 7 illustrates a functional block diagram of an exemplary wireless communications receiver consistent with at least one embodiment of the invention.

Referring to FIGS. 1 and 7, in at least one embodiment, in response to receiving rate switch packet 512, wireless communications device 102 configures receiver 106 in an adjusted rate mode of operation to receive the information at a higher information rate. In at least one embodiment, that higher information rate is achieved at the chip rate and using the same modulation scheme. For example, wireless communications device 102 eliminates the chip-to-symbol mapping of the received information (i.e., eliminating despreading) and instead receives the information at the chip rate. Accordingly, receiver 106 no longer needs to generate despreading codes and wireless communications device 102 decouples despreading code generator 226 from demodulator 224, e.g., using control signal RXSEL to deactivate despreading code generator 226. Instead of despreading 32 chip values into a four-bit symbol, demodulator 224 demodulates eight four-bit symbols using O-QPSK demodulation and forgoes despreading. Embodiments of receiver 106 have two demodulators, a demodulator that is configurable, or a combination thereof (e.g., part of the demodulator is shared and configurable while other parts are dedicated to a predetermined physical interface). While receiving using a base rate physical interface (e.g., receiving a base rate packet and a rate switch packet), a first demodulator is selected or configured and upon receiving a rate switch packet, a second demodulator is selected or configured. In embodiments including a single receiver antenna and multiple demodulators or receiver paths, each demodulator or receiver path is selectively enabled and coupled with radio frequency switches to the receiver antenna. In embodiments including multiple receiver antennas and at least one receiver path, each demodulator or receiver path is selectively enabled and coupled to a selected receiver antenna via radio frequency switches. In an exemplary embodiment, multiple transmitter paths or modulators are used with multiple receiver paths or demodulators to implement a base rate using OQPSK modulation and an adjusted rate using two-level Gaussian frequency shift keying (2GFSK) modulation with BT=0.5. Other embodiments use other combinations of modulation schemes.

Figure 8:
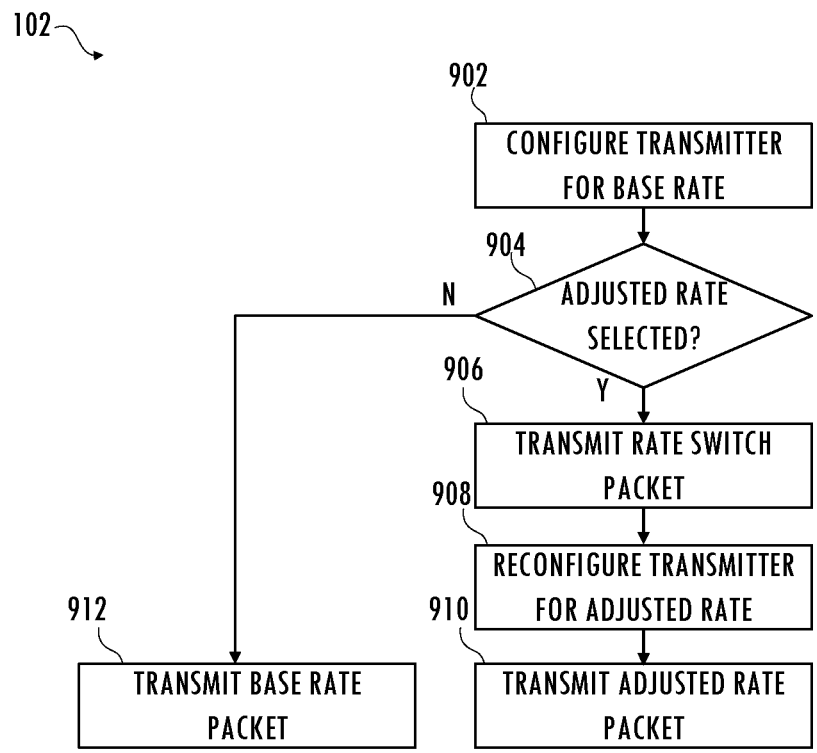
FIG. 8 illustrates an information and control flow for an exemplary transmitter of FIG. 6 consistent with at least one embodiment of the invention.

Referring to FIGS. 1, 6, and 8, in at least one embodiment, wireless communications device 102 configures transmitter 104 in a base rate mode of operation (902). For example, control & data processing circuitry 108 enables spreading code generator 230 to provide a spreading code to modulator 228, which uses the spreading code to spread a packet of information into chip values for transmission at a base rate. Wireless communications device 102 determines whether an adjusted rate configuration is selected after configuring transmitter 104 in the base rate mode of operation (904). In an embodiment, wireless communications device 102 senses channel quality while communicating using one or more packets in the base rate mode of operation. For example, wireless communications device 102 senses quality while receiving an acknowledgement or as part of a quality indication embedded in a payload received at the base rate from wireless communications device 116. If the channel quality is sufficient for communicating adjusted rate packets, wireless communications device 102 selects the adjusted rate configuration. Otherwise, wireless communications device 102 remains in the base rate mode of operation.

If the adjusted rate configuration is not selected, then transmitter 104 transmits the next packet at a base rate (912). For example, modulator 228 spreads the next packet of information into chip values for transmission at a base rate using O-QPSK modulation. If the adjusted rate configuration is selected (904), then transmitter 104 transmits a rate switch packet at the base rate (906). After transmitting the rate switch packet, control & data processing circuitry 108 reconfigures transmitter 104 in an adjusted rate mode of operation (908). For example, control & data processing circuitry 108 decouples spreading code generator 230 from modulator 228 and configures modulator 228 to forgo spreading. Then, transmitter 104 transmits an adjusted rate packet at the adjusted rate (910), e.g., modulates eight four-bit symbols using O-QPSK, and transmits those modulated symbols at the chip rate.

Figure 9:
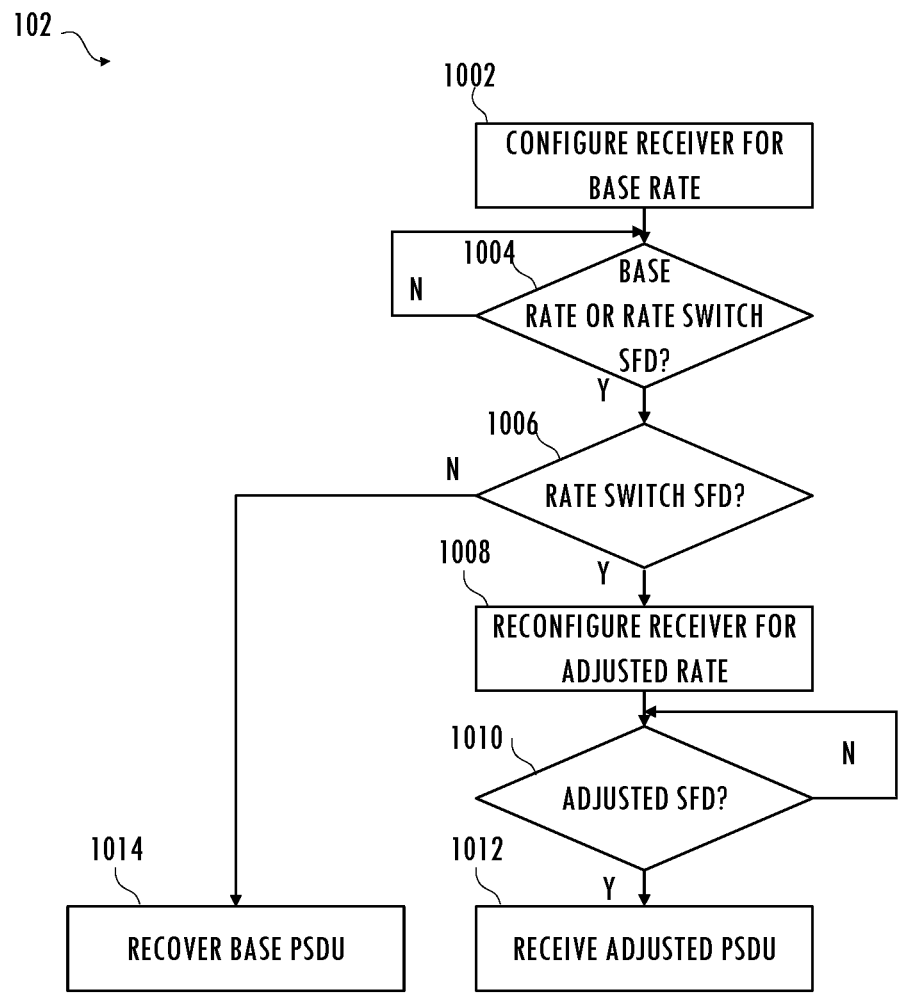
FIG. 9 illustrates an information and control flow for an exemplary receiver of FIG. 7 consistent with at least one embodiment of the invention.

Referring to FIGS. 1, 7, and 9, in at least one embodiment, wireless communications device 102 configures receiver 106 in a base rate mode of operation (1002). For example, control & data processing circuitry 108 enables despreading code generator 226 to provide a despreading code to demodulator 224, which uses the despreading code to recover a symbol of information from received chip values. Control and data processing circuitry 108 searches received bits for a base rate start-of-frame delimiter or rate switch start-of-frame delimiter (1004). In response to detecting a base rate start-of-frame delimiter or rate switch start-of-frame delimiter, control and data processing circuitry 108 determines whether the start-of-frame delimiter is associated with a base rate packet or a rate switch packet (1006). If the start-of-frame delimiter is not a rate switch start-of-frame delimiter, then receiver 106 recovers a base rate physical data unit from the packet according to the predetermined communications protocol (1014). If the start-of-frame delimiter indicates that the packet received at the base rate is a rate switch packet, then control & data processing circuitry 108 reconfigures receiver 106 in an adjusted rate mode of operation (1008). For example, control & data processing circuitry 108 decouples despreading code generator 226 from demodulator 224 using control signal RXSEL and configures demodulator 224 to recover a symbol at the chip rate instead of the legacy information rate. Receiver 106 searches subsequently received bits until detecting an adjusted start-of-frame delimiter (1010) and in response to detecting the adjusted start-of-frame delimiter, receiver 106 recovers an adjusted rate physical layer service data unit in an adjusted rate packet (1012).

In at least one embodiment, receiver 106 starts a timer in response to receiving a rate switch packet. If an adjusted rate preamble or an adjusted rate start-of-frame delimiter is not received within a pre-determined time from starting the timer, then receiver 106 reverts from the adjusted rate configuration to the base rate receiver configuration. This prevents receiver 106 from being endlessly configured for the adjusted rate, thereby preventing receiver 106 from losing the capability to recover base rate packets.

Figure 10:
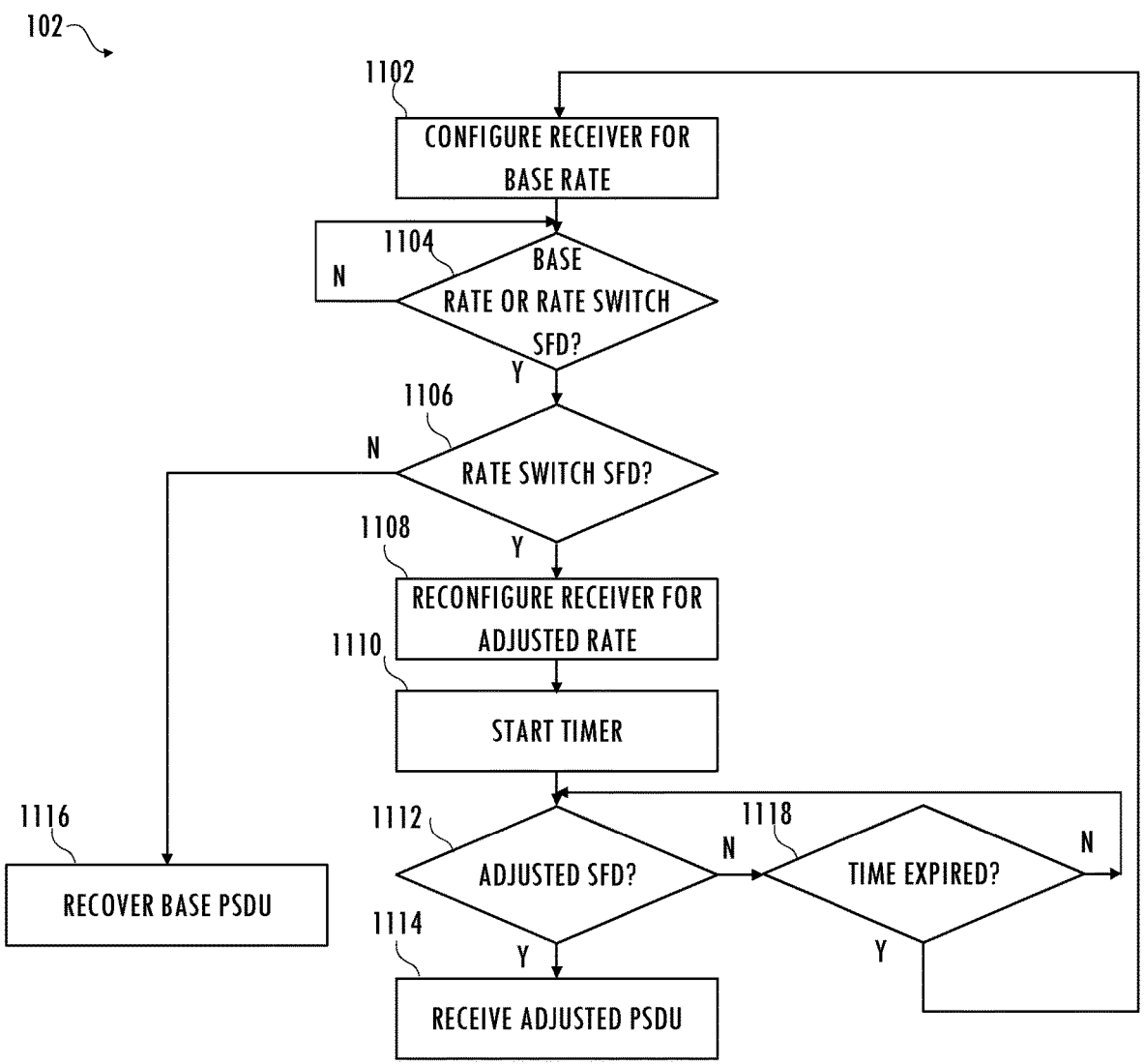
FIG. 10 illustrates an information and control flow for an exemplary receiver of FIG. 7 including a time-out feature consistent with at least one embodiment of the invention.

Referring to FIGS. 1, 7, and 10, in at least one embodiment, wireless communications device 102 configures receiver 106 in a base rate mode of operation (1102). Control and data processing circuitry 108 searches received bits for a base rate start-of-frame delimiter or rate switch start-of-frame delimiter (1104). In response to receiving a base rate start-of-frame delimiter or rate switch start-of-frame delimiter, control and data processing circuitry 108 determines whether the start-of-frame delimiter is associated with a base rate packet or a rate switch packet (1106). If the packet received at the base rate is not a rate switch packet, then receiver 106 recovers a base rate physical data unit from the packet (1116). If the start-of-frame delimiter indicates that the packet received at the base rate is a rate switch packet (1106), then control & data processing circuitry 108 reconfigures receiver 106 in an adjusted rate mode of operation (1108) and starts a timer or counter (1110). Receiver 106 searches subsequently received bits for an adjusted start-of-frame delimiter (1112). If no adjusted start-of-frame delimiter is detected, receiver 106 compares an amount of time elapsed since the timer was started to a predetermined time limit to determine whether a predetermined amount of time has expired (1118). If the predetermined time has elapsed without detecting a next adjusted rate packet, then receiver 106 reconfigures itself in the base rate mode of operation to receive base rate packets (1102). If the predetermined amount of time has not elapsed (1118), then receiver 106 continues to search for a received adjusted rate packet (1112). In response to detecting an adjusted rate preamble or an adjusted rate start-of-frame delimiter (1112), receiver 106 recovers an adjusted rate physical layer service data unit in an adjusted rate packet (1114).

In at least one embodiment, receiver 106 reverts to a base rate configuration from an adjusted rate configuration in response to receiving a predetermined number of consecutive adjusted rate packets. A first adjusted rate packet carries information that indicates a predetermined number of consecutive adjusted rate packets to be received before reverting to the base rate configuration. For example, after receiving a single rate switch packet, the next received adjusted rate packet carries an indication of the predetermined number of consecutive adjusted rate packets that follow the rate switch packet. In an embodiment, if the indication corresponds to a predetermined number of one, then no further adjusted rate switch packets will be recovered after the first adjusted rate packet. In an embodiment, if the indication corresponds to a predetermined integer N, then N−1 more adjusted rate packets will be received after the first adjusted rate packet. In at least one embodiment, the indication is embedded in the physical layer payload, i.e., physical layer service data unit, e.g., as part of the MAC data unit. In another embodiment, the indication for the first adjusted rate packet received after the rate switch packet is embedded in rate switch packet itself, e.g., appended after the rate switch start-of-frame delimiter or as part of the start-of-frame delimiter. The consecutive adjusted rate packets could have a fixed length to allow the receiver to set a time out after which the receiver will transition back to the base rate mode of operation. In this embodiment, indications for consecutive adjusted rate packets need not be transmitted after the rate switch packet because the receiver could determine whether an enumerated consecutive adjusted rate packet has been received from the time at which the enumerated consecutive adjusted rate packet should have been received and can request retransmission of any missing enumerated consecutive adjusted rate packets accordingly. In other embodiments, the indication is embedded in a physical layer header. In an embodiment, a transmitter embeds count information in each packet and decrements a count associated with each adjusted rate packet transmitted. A receiver can use this information to determine whether one or more of the consecutive adjusted rate packets has not been received and can request retransmission of corresponding packets by referring to the associated number(s).

Figure 11:
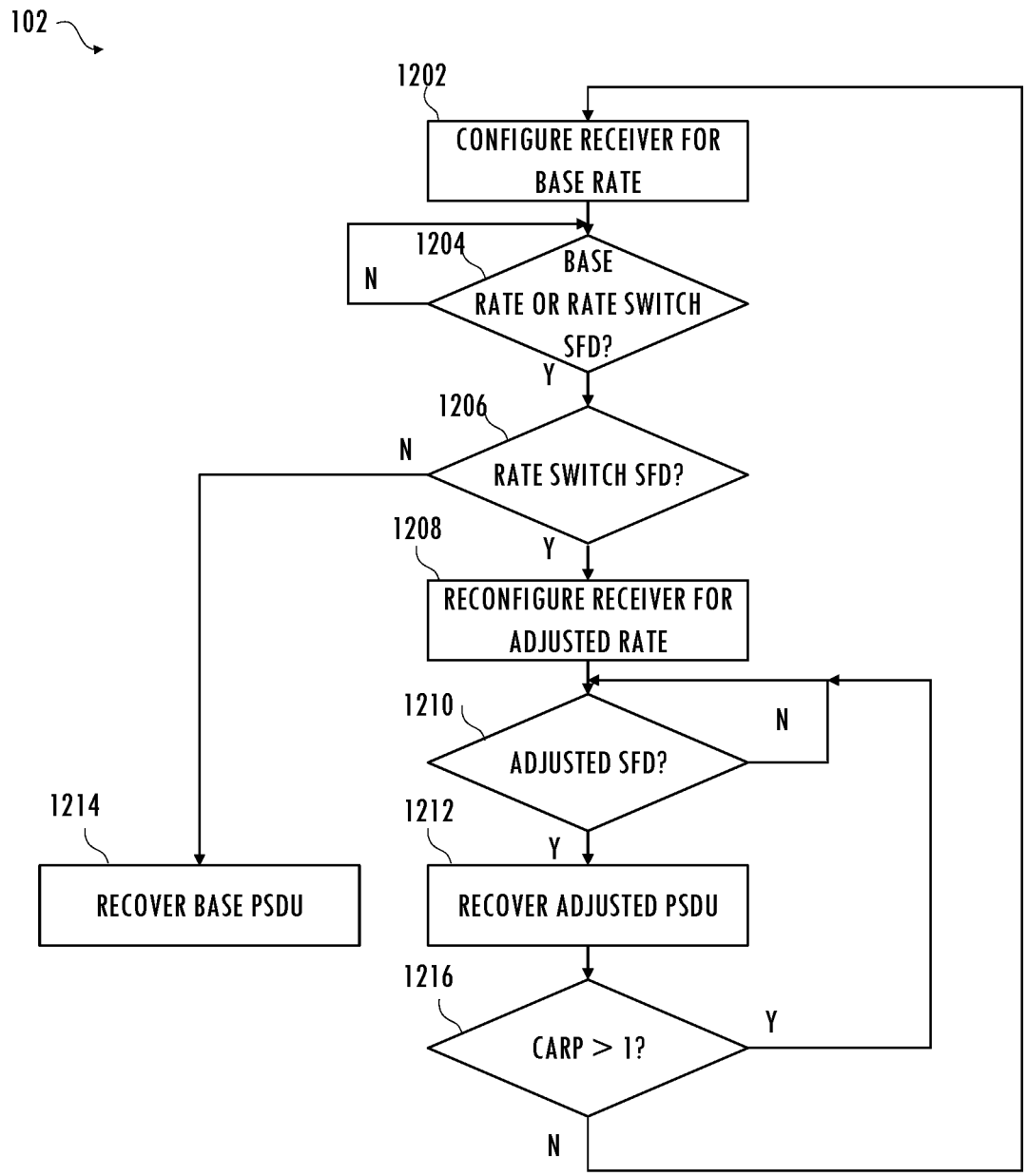
FIG. 11 illustrates an information and control flow for an exemplary receiver of FIG. 7 communicating a predetermined number of consecutive adjusted rate packets consistent with at least one embodiment of the invention.

FIGS. 1, 7, and 11, in at least one embodiment, wireless communications device 102 configures receiver 106 in a base rate mode of operation (1202). Control and data processing circuitry 108 searches received bits for a base rate start-of-frame delimiter or rate switch start-of-frame delimiter (1204). In response to receiving a base rate start-of-frame delimiter or rate switch start-of-frame delimiter, control & data processing circuitry 108 determines whether the start-of-frame delimiter is associated with a base rate packet or a rate switch packet (1206). If the packet received at the base rate is not a rate switch packet, then receiver 106 recovers a base rate physical data unit from the packet (1214). If the start-of-frame delimiter indicates that the packet received at the base rate is a rate switch packet, then control & data processing circuitry 108 reconfigures receiver 106 in an adjusted rate mode of operation (1208). Receiver 106 searches subsequently received bits until detecting an adjusted start-of-frame delimiter (1210). In response to detecting an adjusted start-of-frame delimiter, receiver 106 recovers an adjusted rate physical layer service data unit and a predetermined number of remaining consecutive adjusted rate packets to be received (1212). If the predetermined number of remaining consecutive adjusted rate packets to be received exceeds one (1216), then receiver 106 searches for a next adjusted start-of-frame delimiter (1210). If the predetermined number of remaining consecutive adjusted rate packets to be received does not exceed one, then receiver 106 reconfigures the receiver in the base rate mode of operation (1202). Note that the information and control flows of FIGS. 8-11 are exemplary only and other control sequences may be used.

In at least one embodiment, rather than using a timer, counter, or consecutive adjusted rate packets indicator, receiver 106 performs a channel quality test, e.g., using a received signal strength indicator or other suitable technique. Receiver 106 reverts to the base rate mode of operation from an adjusted rate mode of operation in response to detecting a degradation in the channel quality or a level of channel quality that falls below a predetermined channel quality threshold level.

In at least one embodiment, if a wireless communications device supports the rate switch packet, the wireless communications device communicates this capability to another wireless communications device as part of the physical interface capabilities and may include some details on the supported adjusted rates in relation to an expected start-of-frame delimiter per adjusted rate. This communication may include, but is not restricted to supported, modulation parameters, symbol rates, spreading factors, modulation coding scheme, consecutive adjusted rate packets, etc.

In at least one embodiment, wireless communications system 100 implements clear channel assessment (CCA) to ensure that the channel is not in use by any other device. Clear channel assessment may occur just before communication of a rate switch packet. The rate switch packet and the adjusted rate packet can be considered a single transmission and no additional CCA is needed between the rate switch packet and the adjusted rate packet. Since no additional CCA is needed, the system spends less time on overhead and the rate switch efficiency improves. If the modulation bandwidth of the rate switch physical interface is different from the adjusted rate physical interface, the receive bandwidth, in which the CCA is performed, is set to the larger modulation bandwidth of the two modulation bandwidths to ensure that the channel is available for both packets.

Thus, techniques for using a legacy physical interface to implement higher information rates without costly hardware modifications have been disclosed. The techniques described herein may be deployed in wireless communications devices using a firmware update. The technique does not require detecting a mode switch physical layer header or require seamless mode switching, thus being compatible with legacy hardware and may eliminate a need for a hardware update. The radio may use existing hardware to detect the rate switch packet since the preamble of the rate switch packet uses the same pattern and modulation as the preamble of a base rate packet. Acquiring the rate switch packet may include frequency offset estimation and compensation, automatic gain control, preamble detection, timing recovery or other process that is implemented in the legacy system. The legacy system only needs to check for a new sync word or second start-of-frame delimiter, which may be implemented via a firmware update. In response to detecting the new start-of-frame delimiter (i.e., a rate switch start-of-frame delimiter), the wireless communications device reconfigures the radio to receive the adjusted rate packet. The techniques described herein may be implemented using software executing on a processor (which includes firmware) or by a combination of software and hardware. Software, as described herein, may be encoded in at least one tangible (i.e., non-transitory) computer readable medium. As referred to herein, a tangible computer-readable medium includes at least a magnetic, optical, or electronic storage medium.

The description of the invention set forth herein is illustrative and is not intended to limit the scope of the invention as set forth in the following claims. For example, while the invention has been described in an embodiment in which an IEEE 802.15.4-2020 O-QPSK PHY (e.g., 250 kbps information rate, as used by Zigbee and Thread) interface is configured to support a 2 Mbps information rate, one of skill in the art will appreciate that the teachings herein can be utilized with other wireless communications protocols to achieve other updated information rates. While the invention has been described in an embodiment in which the adjusted rate has a higher information rate than the base rate, one of skill in the art will appreciate that the teachings herein can be utilized to achieve updated communications rates that differ in other ways as a result of different transmission parameters (e.g., modulation scheme, spreading, etc.). For example, a base rate uses O-QPSK and the adjusted rate uses Orthogonal Frequency-Division Multiplexing (OFDM) techniques.

The terms "first," "second," "third," and so forth, as used in the claims, unless otherwise clear by context, distinguish between different items in the claims and do not otherwise indicate or imply any order in time, location, or quality. For example, "a first received signal" and "a second received signal," do not indicate or imply that the first received signal occurs in time before the second received signal. Variations and modifications of the embodiments disclosed herein may be made based on the description set forth herein, without departing from the scope of the invention as set forth in the following claims.

What is claimed is:

1. A method for wireless communications, the method comprising:
   transmitting a base rate packet including a base rate preamble, a base rate start-of-frame delimiter, and a base rate payload;
   transmitting a rate switch packet, the rate switch packet including the base rate preamble and a rate switch start-of-frame delimiter; and
   transmitting an adjusted rate packet after transmitting the rate switch packet, the adjusted rate packet including an adjusted rate preamble, an adjusted rate start-of-frame delimiter, and an adjusted rate payload,
   wherein the base rate packet and the rate switch packet are transmitted at a base rate and the adjusted rate packet is transmitted at an adjusted rate, the adjusted rate being different from the base rate.

2. The method as recited in claim 1 further comprising:
   reconfiguring a transmitter to transmit at the adjusted rate after transmitting the rate switch packet and prior to transmitting the adjusted rate packet.

3. The method as recited in claim 2 wherein the reconfiguring includes disabling spreading of information.

4. The method as recited in claim 1 further comprising:
   sensing channel quality between a transmitter and a receiver after transmitting the base rate packet or the rate switch packet;
   determining whether the channel quality is sufficient for communications at the adjusted rate; and
   selecting the adjusted rate in response to determining that the channel quality is sufficient for communications at the adjusted rate.

5. The method as recited in claim 1 wherein the rate switch packet has fewer information bits than the base rate packet.

6. The method as recited in claim 1 further comprising:
   spreading information of the base rate packet before transmitting the base rate packet;
   spreading information of the rate switch packet before transmitting the rate switch packet; and
   transmitting information of the adjusted rate packet without spreading.

7. The method as recited in claim 1 further comprising:
   selecting an antenna for adjusted rate communications, the selecting using the rate switch packet.

8. The method as recited in claim 1 further comprising:
   transmitting a second rate switch packet, the second rate switch packet including the adjusted rate preamble or the base rate preamble and a second rate switch start-of-frame delimiter; and
   transmitting a second adjusted rate packet after transmitting the second rate switch packet, the second adjusted rate packet including a second adjusted rate preamble, a second adjusted rate start-of-frame delimiter, and a second adjusted rate payload,
   wherein the second adjusted rate packet is transmitted at a second adjusted rate, the second adjusted rate being different from the base rate and the adjusted rate.

9. The method as recited in claim 1 further comprising:
   selecting the adjusted rate from a plurality of adjusted rates based on a quality metric for the wireless communications.

10. A wireless communications system comprising:
    a transmitter having a first mode of operation and a second mode of operation,
    wherein in the first mode of operation the transmitter is configured to transmit information at a base rate, the transmitter is configured to transmit a base rate packet including a base rate preamble, a base rate start-of-frame delimiter, and a base rate payload, and the transmitter is configured to transmit a rate switch packet including the base rate preamble and a rate switch start-of-frame delimiter, and
    wherein in the second mode of operation the transmitter is configured to transmit information at an adjusted rate, the transmitter is configured to transmit an adjusted rate packet after transmitting the rate switch packet, the adjusted rate packet including an adjusted rate preamble, an adjusted rate start-of-frame delimiter, and an adjusted rate payload, the adjusted rate being different from the base rate.

11. The wireless communications system as recited in claim 10, wherein a first wireless communications device comprises:
    a memory; and
    a processor configured to execute instructions stored in the memory, wherein the instructions stored in the memory are executable by the processor to cause the processor to reconfigure the transmitter in the second mode of operation from the first mode of operation after transmitting the rate switch packet.

12. The wireless communications system as recited in claim 11 wherein the instructions stored in the memory are further executable by the processor to cause the processor to reconfigure the transmitter in the first mode of operation from the second mode of operation in response to detecting degradation of a transmission medium used by the wireless communications system.

13. The wireless communications system as recited in claim 10 further comprising:
    a receiver having a third mode of operation and a fourth mode of operation,
    wherein in the third mode of operation the receiver is configured to use the base rate for information recovery, the receiver is configured to recover a second base rate packet including a second base rate preamble, a second base rate start-of-frame delimiter, and a second base rate payload, and the receiver is configured to receive a second rate switch packet, the second rate switch packet including the second base rate preamble and a second rate switch start-of-frame delimiter, and
    wherein in the fourth mode of operation the receiver is configured to recover information at the adjusted rate and the receiver is configured to recover a second adjusted rate packet after receiving the second rate switch packet, the second adjusted rate packet including a second adjusted rate preamble, a second adjusted rate start-of-frame delimiter, and a second adjusted rate payload.

14. The wireless communications system as recited in claim 10 further comprising:
    a first antenna configured to receive a second rate switch packet at the base rate;
    a second antenna configured to receive the second rate switch packet at the base rate; and
    a receiver configured to generate a plurality of quality metrics during reception of the second rate switch packet using the first antenna and the second antenna and configured to select the first antenna or the second antenna for receiving communications from another wireless communications device at the adjusted rate based on the plurality of quality metrics.

15. A method for wireless communications, the method comprising:

receiving a base rate packet including a base rate preamble, a base rate start-of-frame delimiter, and a base rate payload;

receiving a rate switch packet, the rate switch packet including the base rate preamble and a rate switch start-of-frame delimiter; and receiving an adjusted rate packet after receiving the rate switch packet, the adjusted rate packet including an adjusted rate preamble, an adjusted rate start-of-frame delimiter, and an adjusted rate payload, wherein information in the base rate packet and the rate switch packet is received at a base rate and information in the adjusted rate packet is received at an adjusted rate, the adjusted rate being different from the base rate.

16. The method as recited in claim 15 further comprising: configuring a receiver for adjusted rate communications in response to receiving the rate switch packet.

17. The method as recited in claim 16 wherein the configuring includes using a chip rate as an information rate.

18. The method as recited in claim 15 further comprising: determining whether a next adjusted rate packet is received within a predetermined time limit; and restoring the base rate based on the determination.

19. The method as recited in claim 15 further comprising: detecting an indication of a number of adjusted rate packets to be consecutively received after the rate switch packet.

20. The method as recited in claim 19 further comprising: decrementing the indication in response to receipt of each of the number of adjusted rate packets consecutively received after the rate switch packet.

21. The method as recited in claim 20 further comprising: requesting retransmission in response to determining at least one of the number of adjusted rate packets is not received based on the indication.

22. The method as recited in claim 15 further comprising: receiving the rate switch packet using a first antenna and a second antenna;

generating a first quality metric corresponding to the first antenna and a second quality metric corresponding to the second antenna; and selecting the first antenna or the second antenna for receiving communications at the adjusted rate based on the first quality metric and the second quality metric.

* * * * *